United States Patent [19]
Nielsen

[11] Patent Number: 5,991,514
[45] Date of Patent: Nov. 23, 1999

[54] METHOD AND APPARATUS FOR PRINTING A HYPERSPACIAL DOCUMENT

[75] Inventor: Jakob Nielsen, Atherton, Calif.

[73] Assignee: Sun Microsystems, Inc., Palo Alto, Calif.

[21] Appl. No.: 08/656,508

[22] Filed: May 31, 1996

[51] Int. Cl.[6] ...................................................... G06F 19/00
[52] U.S. Cl. ......................... 395/113; 707/513; 707/515; 395/114; 395/101; 345/356; 345/357; 345/973
[58] Field of Search ..................................... 395/779, 761, 395/762, 114, 101, 113; 707/513, 515; 345/356, 357, 973

[56] References Cited

U.S. PATENT DOCUMENTS

| | | | |
|---|---|---|---|
| 4,509,122 | 4/1985 | Agnew | 364/200 |
| 5,331,547 | 7/1994 | Laszlo | 364/413.01 |
| 5,572,643 | 11/1996 | Judson | 395/793 |

OTHER PUBLICATIONS

"Lightweight Databases", S.A. Dobson, V.A. Burrill, Computer Networks and ISDN Systems 27 (1995) 1009–1015.

"WebMap: a graphical hypertext navigation tool", Peter Dömel, Computer Networks and ISDN Systems 28 (1995) 85–97.

Chung, K.–M., et al., "A 'Tiny' Pascal Comiler, Part 1: The P–Code Interpreter," *BYTE Publications Inc.* (1978), pp. 58–65, 148–155.

Chung, K.–M., et al., "A 'Tiny' Pascal Compiler, Part 2: The P–Compiler," *BYTE Publications Inc.* (1978), pp. 34–52.

Thompson, K., "Regular Expression Search Algorithm," *Communications of the ACM* (1968), vol. 11, No. 6, pp. 419–422.

Mitchell, J.G., et al., *Mesa Language Manual,* a Xerox Corp. document.

McDaniel, G., *An Analysis of a Mesa Instruction Set* (1982), a Xerox Corp. document.

Pier, A.P., *A Retrospective on the Dorado, A High–Performance Personal Computer (1983),* a Xerox Corp. document.

Pier, A.P., Retrospective on the Dorado, A High–Performance Personal Computer, Conference Proceedings, The 10th Annual International Symposium on Computer Architecture, Computer Society Press (1983), pp. 252–269.

*Primary Examiner*—Scott Rogers
*Assistant Examiner*—Lance W. Sealy
*Attorney, Agent, or Firm*—Townsend and Townsend and Crew LLP

[57] ABSTRACT

A method and apparatus for printing a hyperspacial document with multiple pages. Each of the pages is composed in a markup language, and a respective printing element is included in each of the pages. The printing element for a given page is either an indicator of which of the pages is to print after the given page or an indicator that there is no page that prints next. When the header portion of a given page is transferred, it is checked to determine whether it contains a printing element. If the printing element is present, then a command to print the multiple pages is activated. The pages are printed in the order specified by the printing elements.

27 Claims, 7 Drawing Sheets

METHOD AND APPARATUS FOR PRINTING A HYPERSPACIAL DOCUMENT

BACKGROUND OF THE INVENTION

This invention relates to hypertext. In particular, this invention relates to printing information located in hyperspace.

With the enormous popularity of the World Wide Web, the old paradigm of a computer as a self-contained resource of essentially linear information has fallen by the wayside. The new paradigm is that of a computer as a resource of hierarchical information, some of which may be resident on another computer that is similarly situated as a hierarchical resource. However, despite the increasing use of such hyperspacial information, some implementations of user services still adhere to the old paradigm.

For example, users often want to print out information that exists only in an on-line format. Printing linear information, such as an e-mail message or a single web page is done quite easily by sending the file containing the e-mail, single web page, etc., to whatever print function is available on the user's system. For hyperspacial information, this simple approach does not work. In fact, in the existing art, a user typically manually downloads every component of the hyperspacial information one at a time and issues a separate print command for each element. Such repetitive downloading and printing can be a substantial amount of work. For example, a hyperspacial document describing the design of the user interface of Sun Microsystems' web site is located at http://www.sun.com/sun-on-net/uidesign and extends over 15 pages. Many users have complained that this document is too difficult to print.

Furthermore, in the existing art, the resulting printouts typically have substantial amounts of whitespace since the components of the hyperspacial document typically have lengths that are different from a whole multiple of the length of a printer page.

HyperCard, a program available from Apple Computer of Cupertino, Calif., includes a "Print Stack" command that prints an entire set of hypertext pages if those pages have been stored in the same file. The pages are printed in the order in which they occur in the file.

The Print Stack command has four weaknesses: First, Print Stack only works if all the elements of the hyperspacial document are present in the same storage file. This weakness implies that all information has to be stored on the same computer and, thus, harkens back to the old paradigm. Second, Print Stack prints every single information unit that is present in the hyperspacial document—even where the author does not intend all of them to be of primary interest to the user. Third, Print Stack works only if all of the hypertext elements have the same size since it prints a fixed number (exactly one, exactly two or exactly four, depending on the user's preference) on every sheet of paper. Finally, Print Stack assumes that all elements of all pages are available, which may not be the case when printing information accessed over the Internet.

SUMMARY OF THE INVENTION

Herein is disclosed a method and apparatus for printing a hyperspacial document with multiple pages. In one embodiment, each of the pages is composed in a markup language, and a respective printing element is included in each of the pages. The printing element for a given page is either an indicator of which of the pages is to print after the given page or an indicator that there is no page that prints next. When the header portion of a given page is transferred, it is checked to determine whether it contains a printing element. If the printing element is present, then a command to print the multiple pages is activated. The pages are printed in the order specified by the printing elements.

The present invention allows the author considerably more flexibility in arranging the storage of the individual hyperspacial document components, which can be stored in multiple directories across multiple servers.

The present invention allows the author to eliminate some of the pages in a web space from the printout sequence.

The present invention allows the various components of a hyperspacial document to have varying sizes, some being larger than a sheet of paper and others shorter.

DESCRIPTION OF THE PREFERRED EMBODIMENT

Definitions

CONTENT: an attribute of a META tag, q.v.

element: a building block for HTML documents.

HEAD: an element of HTML; a container for information about the HTML document in which this element is embedded.

HTML: HyperText Markup Language, the language used to prepare HyperText documents.

HTTP: HyperText Transfer Protocol, a Internet protocol for the distribution of HyperText documents.

IMG: an tag of HTML, with WIDTH and HEIGHT attributes. The IMG tag identifies a image within a HyperText document.

META: an element of HTML, carrying information not accounted for by other HEAD elements. Its CONTENT attribute is mandatory as is one of its NAME and HTTP-EQUIV attributes. The NAME attribute describes the value of the CONTENT attribute. The browser (or other client software) must understand the NAME attribute.

NAME: an attribute of a META tag, q.v.

tag: a component of an element.

Uniform Resource Locator: a character string giving (expressly or impliedly) the protocol, domain name/IP address, port number, path and details of a resource available on the World-Wide Web.

Figure 1A:
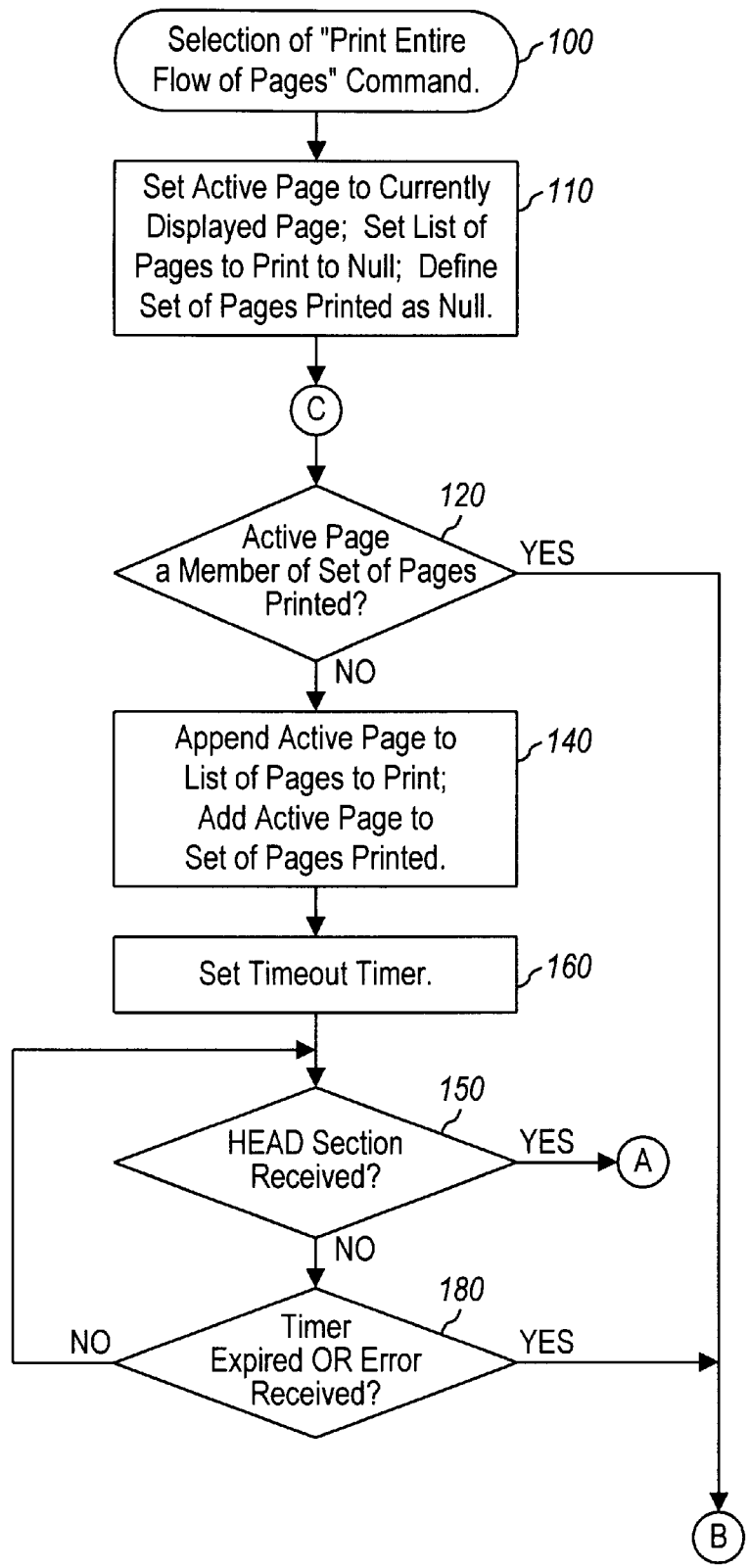
FIGS. 1A, 1B, 3, 4A and 4B illustrate the steps a browser takes when a user activates the "Print Entire Flow of Pages" command of the invention.
Figure 1B:
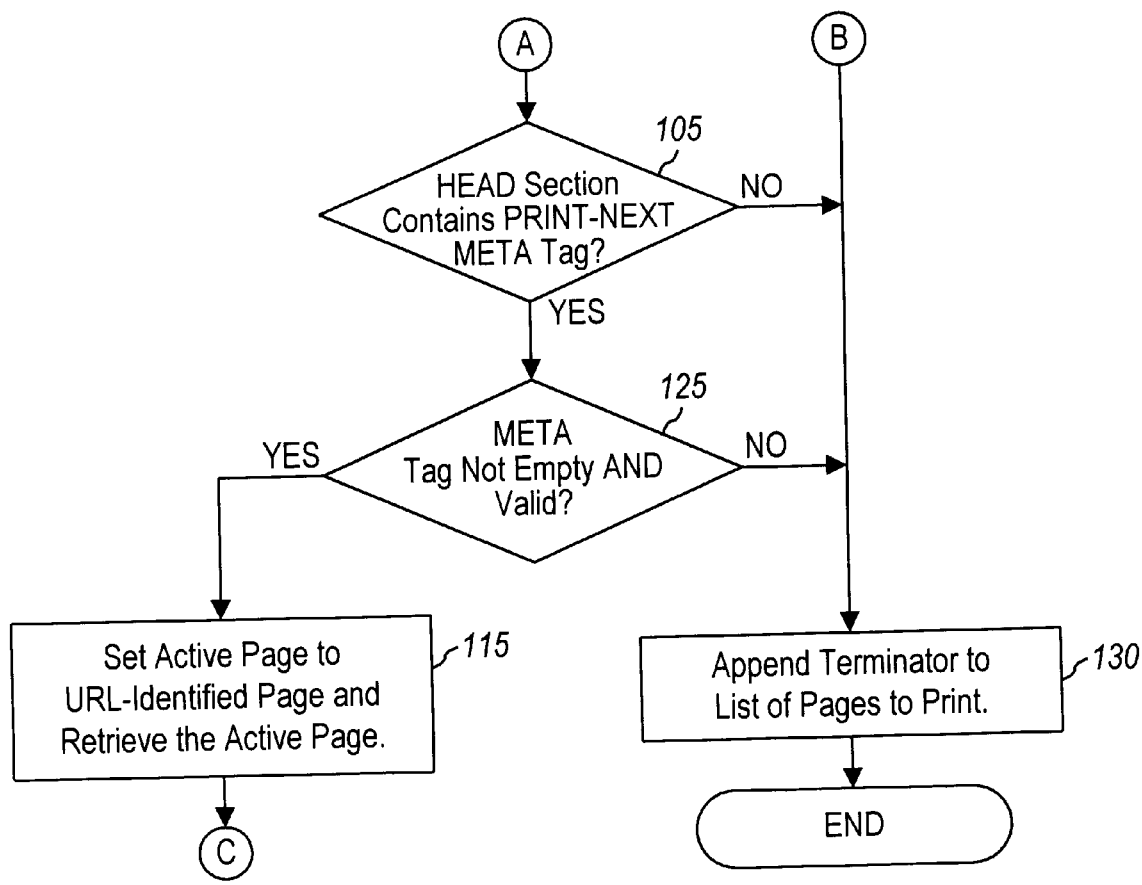
Figure 2:
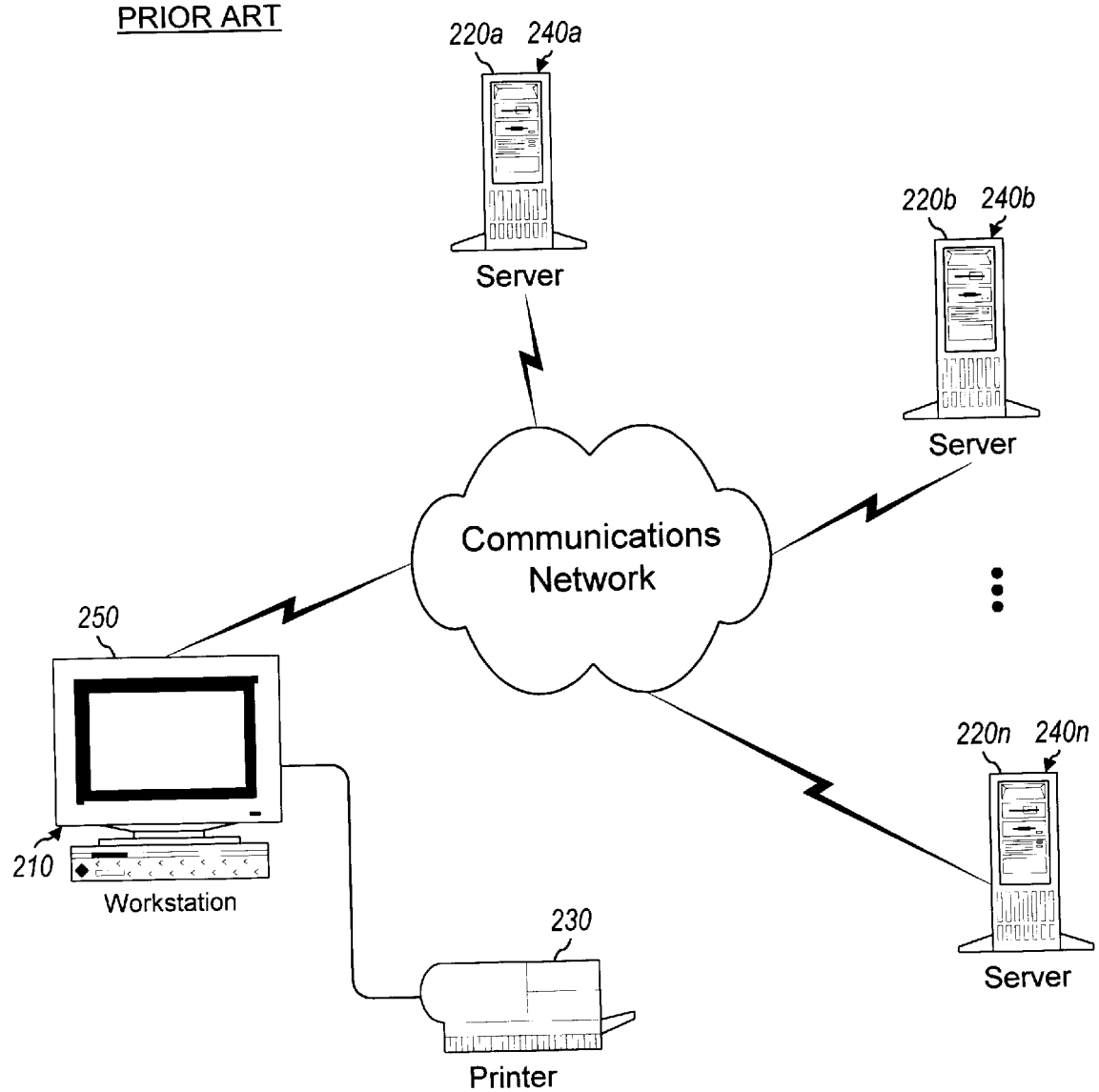
FIG. 2 illustrates a typical client-server environment.
Figure 3:
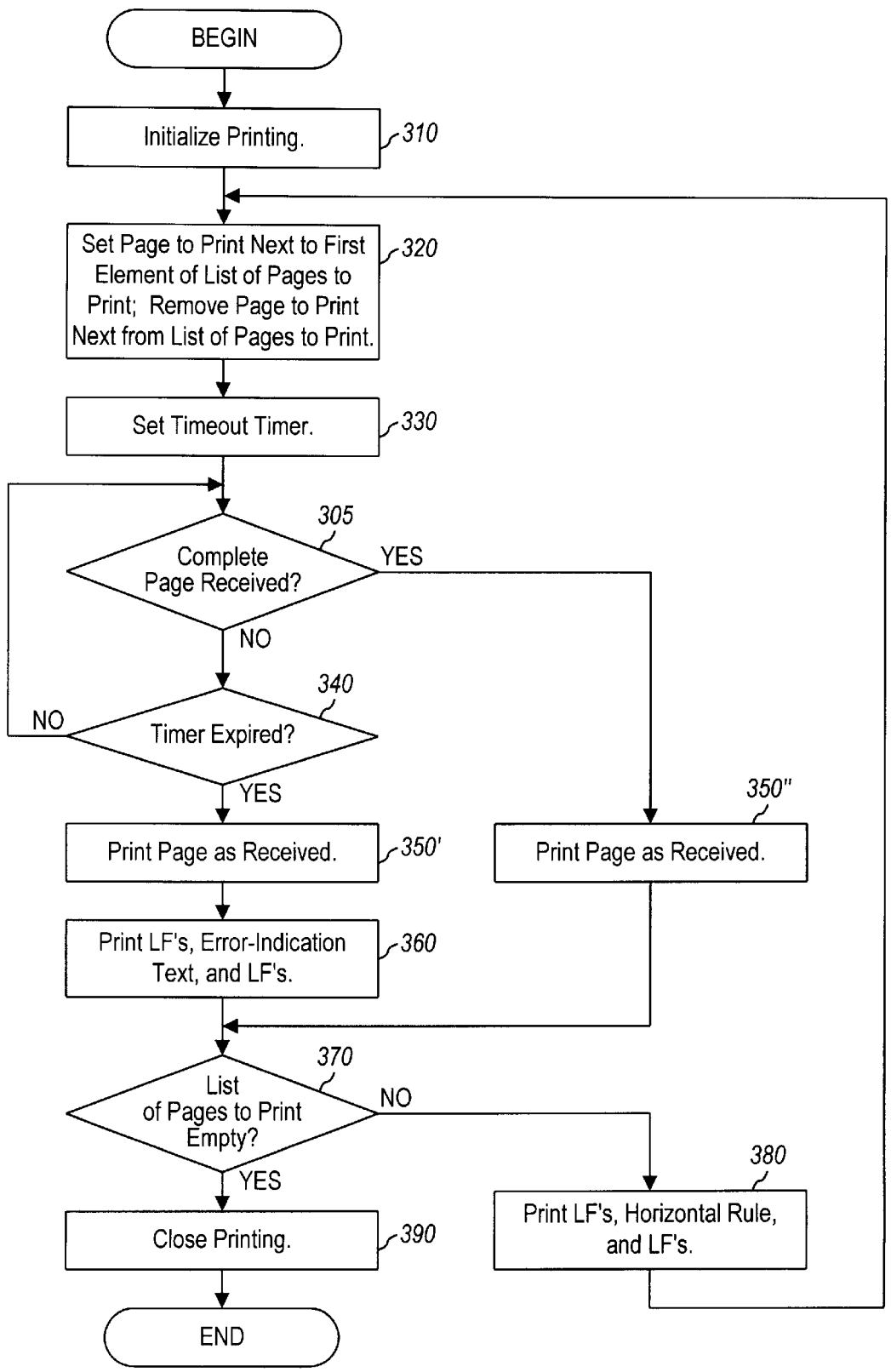
Figure 4A:
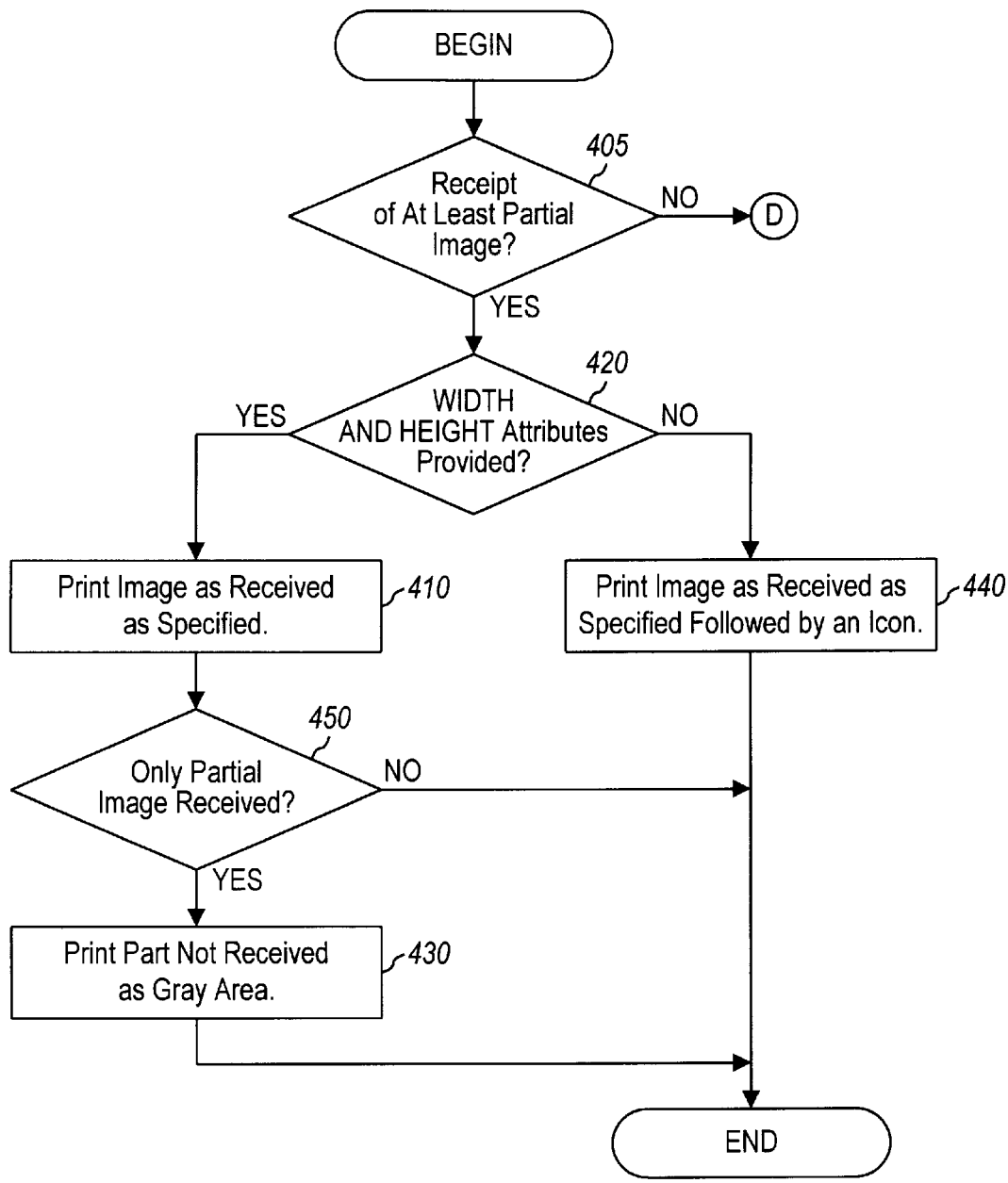
Figure 4B:
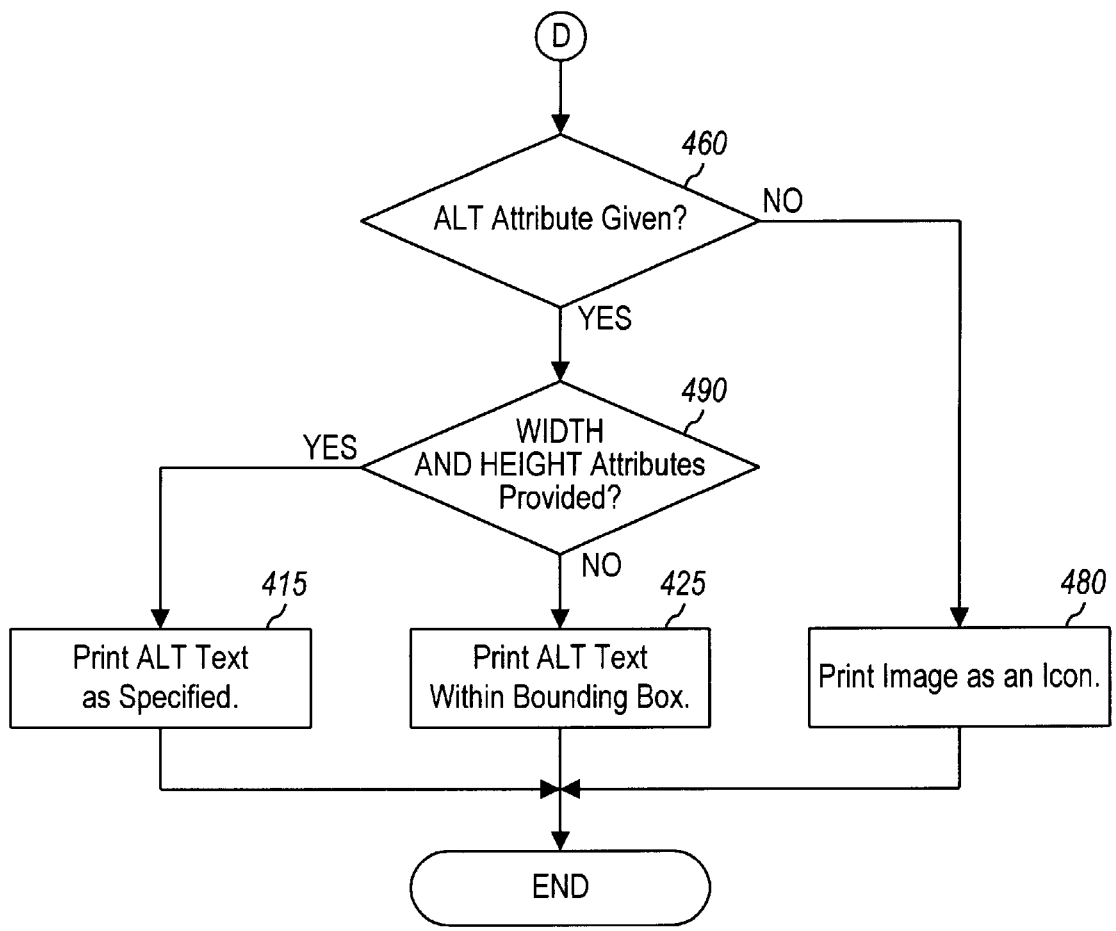

FIG. 2 illustrates a typical client-server environment. As one of ordinary skill in the art will readily appreciate, a user's accessing a web page on the World Wide Web involves the cooperation of (at least) two pieces of software: the web browser 210, typically directly under the user's control as software on the workstation 250, and the server 220 for the web page. Responding in a manner predetermined by the author of the web page to transactions initiated by the browser 210, the server 220 typically resides on a separate processor 240. In the preferred embodiment, this invention involves modifications to the language used to construct such web pages, modifications to the process of authoring of web pages on the server 220, as well as modifications to the operation of the user's web browser 210.

(As the HyperText Markup Language (HTML) is the preferred language for authoring hyperspacial documents, the description below is in the terms of HTML. These terms are explained in I. S. Graham, *The HTML Sourcebook*, 1996 (John Wiley & Sons, Inc., 2d Edition). Graham is incorporated herein by reference to the extent necessary to explain these terms. However, Graham is not prior art.)

Data Structures:

On the server 240, the author of a set of hypertext pages for distribution over the web adds a META tag to the HEAD section of each page, indicating what web page is the next web page to print in the hypertext of this web page. In one embodiment, the META tag is as follows:

<META NAME="PRINT-NEXT" CONTENT="http://www.server.com/directory/page.html">

In this tag, the value of the CONTENT attribute is a Uniform Resource Locator (URL) that specifies the next page that should be printed. If a page is the last page, the author eliminates the PRINT-NEXT META tag. For clarity, however, the author preferably uses the following META tag:

<META NAME="PRINT-NEXT" CONTENT="">

Note that the CONTENT attribute can be any valid URL, including a pointer to information in another directory or on another server 240.

Relative URLs are permissible. If the next page is stored in the same directory as the current page, the META tag could be:

<META NAME="PRINT-NEXT" CONTENT="page.html">

Protocols:

When the user's web browser 210 (or other client software) retrieves a web page for display (in a well-known manner), it checks the header of the web page for the presence of a PRINT-NEXT META tag. If the browser 210 finds this tag (and the CONTENT attribute is not the empty string signifying the last page in a printout), then the software activates a "Print Entire Flow of Pages" command.

A preferred embodiment adds this command to the same menu as (or to a menu subordinate from) the one where the Print command is found (normally, the File menu) and places it immediately below the Print command. If no PRINT-NEXT META tag is found in the header for the current web page or if the CONTENT attribute is the empty string, then the software grays out the "Print Entire Flow of Pages" command in the menu. Alternative embodiments allow the user to select the "Print Entire Flow of Pages" command by pressing a function key on the keyboard, by speaking a voice-activated command, or by similar express method.

FIGS. 1A, 1B, 3, 4A and 4B illustrate the steps the browser 210 takes when the user selects the "Print Entire Flow of Pages" command (step 100). The browser 210 defines the "active page" as being the web page displayed in the active window at the time the "Print Entire Flow of Pages" command was selected; initializes a list of pages to print as empty; and initializes a set of all pages printed as the empty set (step 110).

The browser 210 cycles through the following steps one page at a time:

It checks whether the active page is already a member of the set of all pages printed (step 120). If so, the browser 210 adds a terminus indicator to the list of pages to print (step 130) and exits the loop. If not, the browser 210 adds the active page to the set of all pages printed (step 140). This step prevents infinite loops.

The browser 210 then adds the active page to the end of the list of pages to print (step 140).

The browser 210 waits until the HEAD section of the active page has been downloaded (step 150). In a preferred embodiment, the browser 210 sets a timeout timer to a timeout interval that a user can set (but is preferably one minute by default) (step 160). If the HEAD section is not downloaded before expiration of the timeout interval or if an error message is received (step 180), then the browser 210 adds a terminus indicator to the list of pages to print (step 130) and exits the loop.

If the HEAD section of the active page has been downloaded before the timeout interval expires, then the browser 210 checks whether it contains a PRINT-NEXT META tag with a CONTENT attribute that is not the empty string and is a valid URL (steps 105 and 125). If so, the browser 210 sets the active page to the page that the URL identifies and starts retrieving the active page (step 115). The browser 210 then continues the loop at step 120.

If the HEAD section does not contain a PRINT-NEXT META tag, the CONTENT attribute of the tag is an empty string or the attribute's value is an invalid URL (steps 105 and 125), the browser 210 adds a terminus indicator to the list of pages to print and exits the loop (step 130).

In parallel with the loop of steps 115 through 180, the browser 210 also executes the following loop, multithreading the two set of activities. In the preferred embodiment, the browser 210 uses the multithreading capabilities of the Solaris® operating system, available from Sun Microsystems, Inc., the assignee of the instant invention:

The browser 210 initializes printing using whatever prior art it uses for printing web pages (step 310). This initialization may involve showing a dialog box to the user to select the number of copies printed, the printer, color or monochrome, and many other options well-known in the art. Preferably, the initialization of printing for the Print Entire Flow of Pages command duplicates exactly the initialization of printing for the existing 'Print' command.

The browser 210 defines the "page to print next" as the first element in the list of pages to print and removes the page to print next from the top of the list of pages to print (step 320).

The browser 210 then sets a timeout timer to a timeout interval that a user can set (but is preferably 5 minutes by default) (step 330). The browser 210 waits until either it receives the complete web page for the page to print next (step 305) or the waiting interval expires (step 340).

The browser 210 then sends as much of the page to print next as it has to the printer 230 (step 350). If it does not have the entire file, the browser 210 furthermore sends two line feeds, some error-indication text such as "TRANSFER INTERRUPTED," and two more line feeds to the printer 230 (step 360).

The browser 210 checks whether the list of pages to print contains at least one element other than the terminus indicator (step 370). If so, it sends two line feeds, a horizontal rule, and two more line feeds to the printer 230 (step 380) and continues the loop at step 320. If the list of pages to print is empty (i.e., contains only the terminus indicator), the browser 210 closes printing (using whatever prior art it uses for finishing the printing of a web page) (step 390) and exits the loop. "Retrieving a page" as described in step 115 is performed using methods well-known in the art to retrieve a web page (most typically, a HyperText Transfer Protocol (HTTP) GET request)—with the exception that the page is not displayed on the screen. In particular, the browser 210 retrieves first the HTML text of the page and then any embedded images (indicated by an <IMG> tag). The browser 210 does not spend time retrieving page elements that would not be visible in a printout. For example, sound files are not retrieved, and background patterns are not retrieved unless the user has indicated a preference to have background patterns printed.

In step 350, if any embedded images have not been fully received at the time the page is printed, then the browser 210 takes the following steps to determine what to print:

If the browser 210 receives some part of an image (step 405), then it prints that part. If the HTML text with the page definition provides WIDTH and HEIGHT attributes for the image (step 420), then the image is printed in an area with the specified dimensions (step 410) and any part of the area for which no image data is available (step 450) is printed in a 20% gray (step 430). If WIDTH and HEIGHT dimensions are not available (step 420), then the available image data is printed followed by an icon showing a broken image (step 440).

If the browser 210 has received no part of the image (step 405), then the text given as an ALT attribute for the image is printed, if available (step 460). If no ALT text is available, then an icon showing a broken image is printed (step 480). The browser 210 prints the text (or icon) centered horizontally and vertically within a box with the dimensions given as WIDTH and HEIGHT attributes for the image (step 415). If WIDTH and HEIGHT dimensions are not available (step 490), then the text (or icon) is printed within a box that is sized as the bounding box for the text (or icon) (step 425).

Figure 5A:
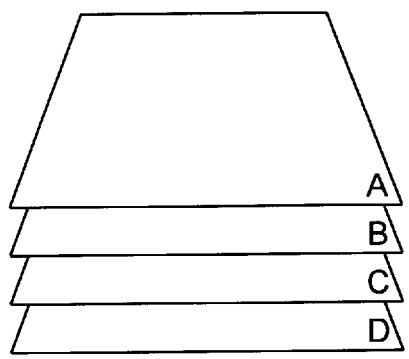
FIGS. 5A through 5D illustrate various methods of printing out a hyperspacial document.
Figure 5B:
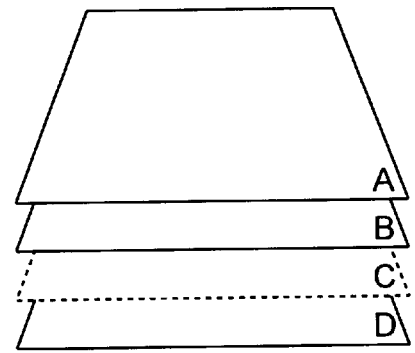
Figure 5C:
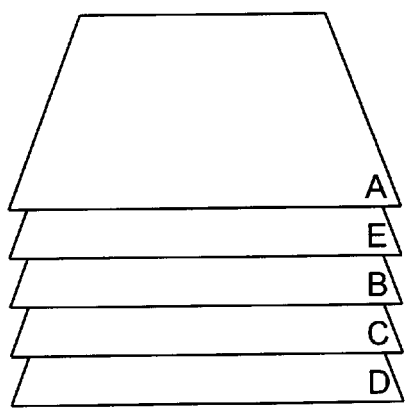
Figure 5D:
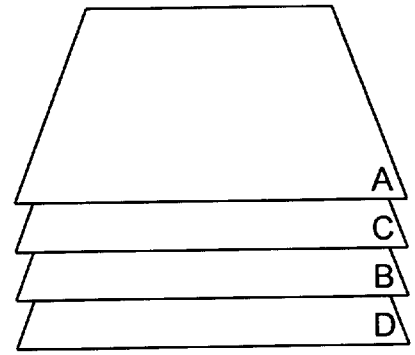

FIGS. 5A through 5D illustrate various methods for printing a hyperspacial document. Assuming a four-page document consisting of pages A, B, C and D, a first method for printing the document is shown in FIG. 5A, wherein the pages are printed in the order in which they are viewed. In contrast, the invention described herein allows the document to print as shown in FIG. 5B, with one or more pages omitted. In yet another embodiment, the invention allows the hyperspacial document of FIG. 5A to print as shown in FIG. 5C, wherein one or more additional pages that are not seen on viewing nonetheless print out. Finally, the invention allows the printing of the hyperspacial document of FIG. 5A as shown in FIG. 5D, wherein one or more of the pages of the document print out of sequence. Of course, these printing methods may be variously combined.

Of course, the program text for such software as is herein disclosed can exist in its static form on a magnetic, optical or other disk, on magnetic tape or other medium requiring media movement for storage and/or retrieval, in ROM, in RAM, or in another data storage medium. That data storage medium may be integral to or insertable into a computer system.

What is claimed is:

1. A computer-implemented method for printing a hyperspacial document, said hyperspacial document having a plurality of hypertext pages, said method comprising:
   composing each of said plurality of hypertext pages in a markup language;
   providing a header portion in at least one of said plurality of hypertext pages;
   preparing said plurality of hypertext pages for printing by including in each of said plurality of hypertext pages a respective printing element in said markup language, said printing element indicating a next hypertext page to print or that there is no page to print next;
   transferring said header portion of a first hypertext page from a first processor to a second processor;
   inspecting said header portion of said first hypertext page for presence of said printing element;
   activating a printing sequence if said printing element is present in said header portion; and
   printing said plurality of hypertext pages in accordance with said printing elements.

2. The method of claim 1 wherein said step of composing comprises
   composing in the HyperText Markup Language; and said step of preparing comprises
      including a META tag as said respective printing element.

3. The method of claim 2 wherein said step of preparing comprises
   including a META tag having NAME and CONTENT attributes, said attributes each having a value, said NAME attribute having a value that is an indicator that the value of said CONTENT attribute is an indicator of which of said plurality of hypertext pages to print next.

4. The method of claim 3 wherein said step of preparing comprises
   including a META tag having NAME and CONTENT attributes, said NAME attribute having a value set to "PRINT-NEXT" and said CONTENT attribute having a value set either to a Uniform Resource Locator for one of said plurality of hypertext pages to print next or to an indicator that said CONTENT attribute is not a Uniform Resource Locator.

5. The method of claim 1 wherein said hyperspacial document exists on said first processor and said method further comprises:
   transferring said plurality of hypertext pages from said first processor to said second processor.

6. A computer-implemented method for printing a hyperspacial document, said hyperspacial document having a plurality of hypertext pages, one of said plurality of hypertext pages having a header section, said method comprising:
   locating said one hypertext page on a first processor;
   transferring said header portion from said first processor to a second processor;
   checking said header portion to determine whether said header portion contains a printing element; and
   activating a command to print said plurality of hypertext pages if said header portion contains said printing element and said printing element is not an indicator that there is no page to print next.

7. The method of claim 6 further comprising the step of activating a command to print a page in a menu, wherein said step of activating a command to print said plurality of hypertext pages comprises
   activating said command to print said plurality of hypertext pages in the same menu as said command to print a page if said header portion contains said printing element and said printing element is not an indicator that there is no page to print next.

8. The method of claim 6 further comprising the step of activating a command to print a page in a menu, wherein said step of activating a command to print said plurality of hypertext pages comprises
   activating said command to print said plurality of hypertext pages in a menu subordinate to said menu containing said command to print a page if said header portion contains said printing element and said printing element is not an indicator that there is no page to print next.

9. The method of claim 7 further comprising:

graying out a command to print said plurality of hypertext pages in said menu if said header portion lacks said printing element or said printing element is an indicator that there is no page to print next.

10. The method of claim 1 further comprising:

receiving said header portion of said first hypertext page on said second processor;

checking said header portion to determine whether said header portion contains said printing element; and permitting a user to expressly activate a command to print said plurality of hypertext pages if said header portion contains said printing element and said printing element is not an indicator that there is no page to print next.

11. The method of claim wherein said printing comprises a. setting an active page to said one page; setting a list of pages to print to NULL; and defining a set of pages printed as NULL;

b. determining whether said active page is a member of said set pages printed;

c. appending said active page to said list of pages to print; and adding said active page to said set of pages printed if said active page is not a member of said set of pages printed; otherwise, continuing at h.;

d. waiting until the HEAD section of said active page is received;

e. determining whether said HEAD section contains said printing element and whether said printing element is not an indicator that there is no page to print next and said indicator of which of said plurality of hypertext pages to print next is valid;

f. setting said active page to the page of said plurality of hypertext pages indicated by said printing element and retrieving said active page if said HEAD section contains said printing element and said printing element is not an indicator that there is no page to print next and said indicator of which of said plurality of hypertext pages to print next is valid; otherwise, continuing at h.;

g. continuing at b.; and h. appending a terminator to said list of pages to print.

12. The method of claim 11 wherein said step of printing further comprises a. initializing printing;

b. setting a page to print next variable to the first element of said list of pages to print; removing said page to print next from said list of pages to print;

c. receiving said page to print next;

d. printing said page as received;

e. printing an error indicator if said page as received is not complete;

f. determining whether said list of pages to print is empty; and g. closing printing if said list of pages to print is empty; otherwise, continuing from step 13.b.

13. The method of claim 12 wherein said step of receiving said page to print next comprises failing to display said page to print next.

14. An article of manufacture comprising a medium for data storage wherein is located a computer program for causing a computer system to print a hyperspacial document, said hyperspacial document having a plurality of hypertext pages, one of said plurality of hypertext pages having a header section, said program comprising:

code for assisting transference of said header portion from a first processor to a second processor;

code for checking said header portion to determine whether said header portion contains a printing element; and code for activating a command to print said plurality of hypertext pages if said header portion contains said printing element and said printing element is not an indicator that there is no page to print next.

15. A hyperspacial document comprising:

a plurality of hypertext pages, each having markup language text or an image for display; and a printing element for each of said plurality of hypertext pages, said printing element either an indicator of which of said plurality of hypertext pages to print next or an indicator that there is no page to print next.

16. A computer-implemented method for retrieving and printing a hyperspacial document, said hyperspacial document including a plurality of printable and unprintable portions, said method comprising:

transferring a header portion in a first portion of said hyperspacial document from a first processor to a second processor;

accessing from said second processor said header portion of said first portion of said hyperspacial document;

checking said accessed portion for inclusion of a printing element;

determining whether said printing element indicates that said accessed portion is printable;

printing said accessed portion in accordance with said printing element;

identifying a next portion, if any, linked to said accessed portion of said hyperspacial document;

repeating said accessing, checking, determining, printing, and identifying for remaining portions of said hyperspacial document.

17. The method of claim 16 wherein said unprintable element comprises a sound file.

18. The method of claim 16 wherein said hyperspacial document further comprises a background pattern and said step of retrieving further comprises failing to retrieve said background pattern.

19. A computer-implemented method for printing a hyperspacial document having a plurality of hypertext pages, said method comprising:

ordering said plurality of hypertext pages for viewing;

ordering said plurality of hypertext pages for printing, said order for viewing and said order for printing differing; and printing said plurality of hypertext pages according to said order for printing.

20. The method of claim 19 wherein said ordering for printing comprises omitting a page from said plurality of hypertext pages.

21. The method of claim 19 wherein said ordering for printing comprises inserting a page between or among said plurality of hypertext pages.

22. An apparatus for preparing a hyperspacial document for printing, said hyperspacial document having a plurality of hypertext pages, said apparatus comprising:

a first processor;

memory coupled to said first processor; and an editor located in said memory and running on said first processor, said editor composes each of said plurality of hypertext pages in a markup language, provides a header portion in at least one of said plurality of hypertext pages, prepares said plurality of hypertext pages for printing by including in each of said plurality of hypertext pages a respective printing element in said markup language, said printing element indicating a next hypertext page to print or that there is no page to print next, and initiates a transfer of said header portion from said first processor to a second processor, wherein printing of said hyerspacial document is achieved by inspecting said header portion of a first hypertext page for presence of said printing element;

activating a printing sequence if said printing element is present in said header portion; and issuing a command to print said plurality of hypertext pages in accordance with said printing elements.

23. An article of manufacture comprising a medium for data storage wherein is located a computer program for causing a computer system to print a hyperspacial document having a plurality of hypertext pages, said program comprising:

code for ordering said plurality of hypertext pages for viewing;

code for ordering said plurality of hypertext pages for printing, said order for viewing and said order for printing differing; and code for printing said plurality of hypertext pages according to said order for printing.

24. A computer-implemented method for printing a hyperspacial document, said hyperspacial document available from a server and having an image, said method comprising:

accessing said server for said hyperspacial document;

selecting a first portion for processing;

transferring a header portion in a first portion of said hyperspacial document from said server to a processor;

checking said selected portion of said image for a printing element;

determining whether said printing element indicates that said selected portion is printable;

retrieving said selected portion of said image if said selected portion includes at least one print element and said printing element indicates that said selected portion is printable;

printing said selected portion of said image in accordance with said printing element;

identifying a next portion, if any, linked to said selected portion of said image;

repeating said checking, determining, retrieving, printing, and identifying for remaining portions of said image.

25. The method of claim 24 wherein said sub-step of printing said indicator comprises printing a gray area.

26. The method of claim 25 wherein said sub-step of printing a gray area comprises printing a gray area having the dimensions of the remainder of said image that was not retrieved.

27. The method of claim 25 wherein said sub-step of printing said indicator comprises printing an icon indicating that the remainder of said image was not retrieved.

* * * * *